(12) United States Patent
Maddukuri et al.

(10) Patent No.: US 12,164,638 B2
(45) Date of Patent: Dec. 10, 2024

(54) DATA SHARING SYSTEM AND METHOD FOR A MULTI-BOOT BASEBOARD MANAGEMENT CONTROLLER (BMC)

(71) Applicant: Dell Products, L.P., Round Rock, TX (US)

(72) Inventors: Akkiah Choudary Maddukuri, Austin, TX (US); Chandrasekhar Mugunda, Austin, TX (US); Marshal F. Savage, Austin, TX (US); Prashanth Giri, Round Rock, TX (US); Eugene David Cho, Austin, TX (US)

(73) Assignee: Dell Products, L.P., Round Rock, TX (US)

( * ) Notice: Subject to any disclaimer, the term of this patent is extended or adjusted under 35 U.S.C. 154(b) by 246 days.

(21) Appl. No.: 17/347,045

(22) Filed: Jun. 14, 2021

(65) Prior Publication Data

US 2022/0398320 A1    Dec. 15, 2022

(51) Int. Cl.
*G06F 21/57*     (2013.01)
*G06F 21/31*     (2013.01)
*G06F 21/60*     (2013.01)

(52) U.S. Cl.
CPC .......... *G06F 21/572* (2013.01); *G06F 21/31* (2013.01); *G06F 21/575* (2013.01); *G06F 21/602* (2013.01); *G06F 2221/2141* (2013.01)

(58) Field of Classification Search
CPC ...... G06F 21/572; G06F 21/31; G06F 21/575; G06F 21/602; G06F 2221/2141
See application file for complete search history.

(56) References Cited

U.S. PATENT DOCUMENTS

| | | | |
|---|---|---|---|
| 10,860,308 B1* | 12/2020 | Kulchytskyy | G06F 21/572 |
| 2012/0173953 A1* | 7/2012 | Flynn | G06F 8/654 |
| | | | 717/170 |
| 2013/0047031 A1* | 2/2013 | Tabone | G06F 9/4403 |
| | | | 714/15 |
| 2019/0095195 A1* | 3/2019 | Lin | G06F 8/654 |
| 2020/0134185 A1* | 4/2020 | Cho | G06F 21/602 |
| 2020/0226028 A1* | 7/2020 | Kotary | G06F 11/2084 |
| 2021/0141626 A1* | 5/2021 | Ladkani | G06F 3/0604 |
| 2022/0147340 A1* | 5/2022 | Chang | G06F 9/44505 |

* cited by examiner

*Primary Examiner* — Hyun Soo Kim
(74) *Attorney, Agent, or Firm* — Fogarty LLP

(57) ABSTRACT

An Information Handling System (IHS) includes multiple hardware devices, and a baseboard Management Controller (BMC) in communication with the plurality of hardware devices. The BMC includes instructions for executing a first BMC firmware stack that uses certain data for its operation. The data used by the first BMC firmware stack is stored in a first memory location. The instructions are further configured to halt execution of the first BMC firmware stack, and begin execution of a second BMC firmware stack by copying the data from the first memory location to a second memory location used by the second BMC firmware stack.

18 Claims, 8 Drawing Sheets

DATA SHARING SYSTEM AND METHOD FOR A MULTI-BOOT BASEBOARD MANAGEMENT CONTROLLER (BMC)

FIELD

The present disclosure generally relates to electronics, and, more particularly, to a data sharing system and method for a multi-boot baseboard management controller (BMC).

BACKGROUND

An Information Handling System (IHS) generally refers to any computing system that processes, compiles, stores, and/or communicates information or data for business, personal, or other purposes. Modern day IHS administrative management is often provided via baseboard management controllers (BMCs). The baseboard management controller (BMC) generally includes a specialized microcontroller embedded in the IHS, and may provide an interface between system-management software and platform hardware. Different types of sensors built into the IHS report to the BMC on parameters such as temperature, cooling fan speeds, power status, operating system (O/S) status, and the like. The BMC monitors the sensors and can send alerts to a system administrator via the network if any of the parameters do not stay within pre-set limits, indicating a potential failure of the system. The administrator can also remotely communicate with the BMC to take certain corrective actions, such as resetting or power cycling the system to get a hung O/S running again. These abilities can often save on the total cost of ownership of an IHS, particularly when implemented in large clusters, such as server farms.

SUMMARY

According to one embodiment, an Information Handling System (IHS) includes multiple hardware devices, and a baseboard Management Controller (BMC) in communication with the plurality of hardware devices. The BMC includes instructions for executing a first BMC firmware stack that uses certain data for its operation. The data used by the first BMC firmware stack is stored in a first memory location. The instructions are further configured to halt execution of the first BMC firmware stack, and begin execution of a second BMC firmware stack by copying the data from the first memory location to a second memory location used by the second BMC firmware stack.

According to another embodiment, a data sharing method for a multi-boot baseboard management controller (BMC) includes the steps of executing a first BMC firmware stack using a BMC in communication with a plurality of hardware devices of an information handling system (IHS) in which the first BMC firmware stack stores data, which is used for operation of the first BMC firmware stack, in a first memory location. The data sharing method further includes the step of halting execution of the first BMC firmware stack, and beginning execution of a second BMC firmware stack by copying the data from the first memory location to the second location used by the second BMC firmware stack.

According to yet another embodiment, a baseboard management controller (BMC), which communicates with multiple hardware devices of an information handling system (IHS), includes instructions for executing a first BMC firmware stack. The first BMC firmware stack stores data, which is used for operation of the first BMC firmware stack, in a first memory location. The instructions are further executed to halt execution of the first BMC firmware stack, and begin execution of a second BMC firmware stack by copying the data from the first memory location to the second location that is used by the second BMC firmware stack.

BRIEF DESCRIPTION OF THE DRAWINGS

The present invention(s) is/are illustrated by way of example and is/are not limited by the accompanying figures. Elements in the figures are illustrated for simplicity and clarity, and have not necessarily been drawn to scale.

DETAILED DESCRIPTION

Figure 1:
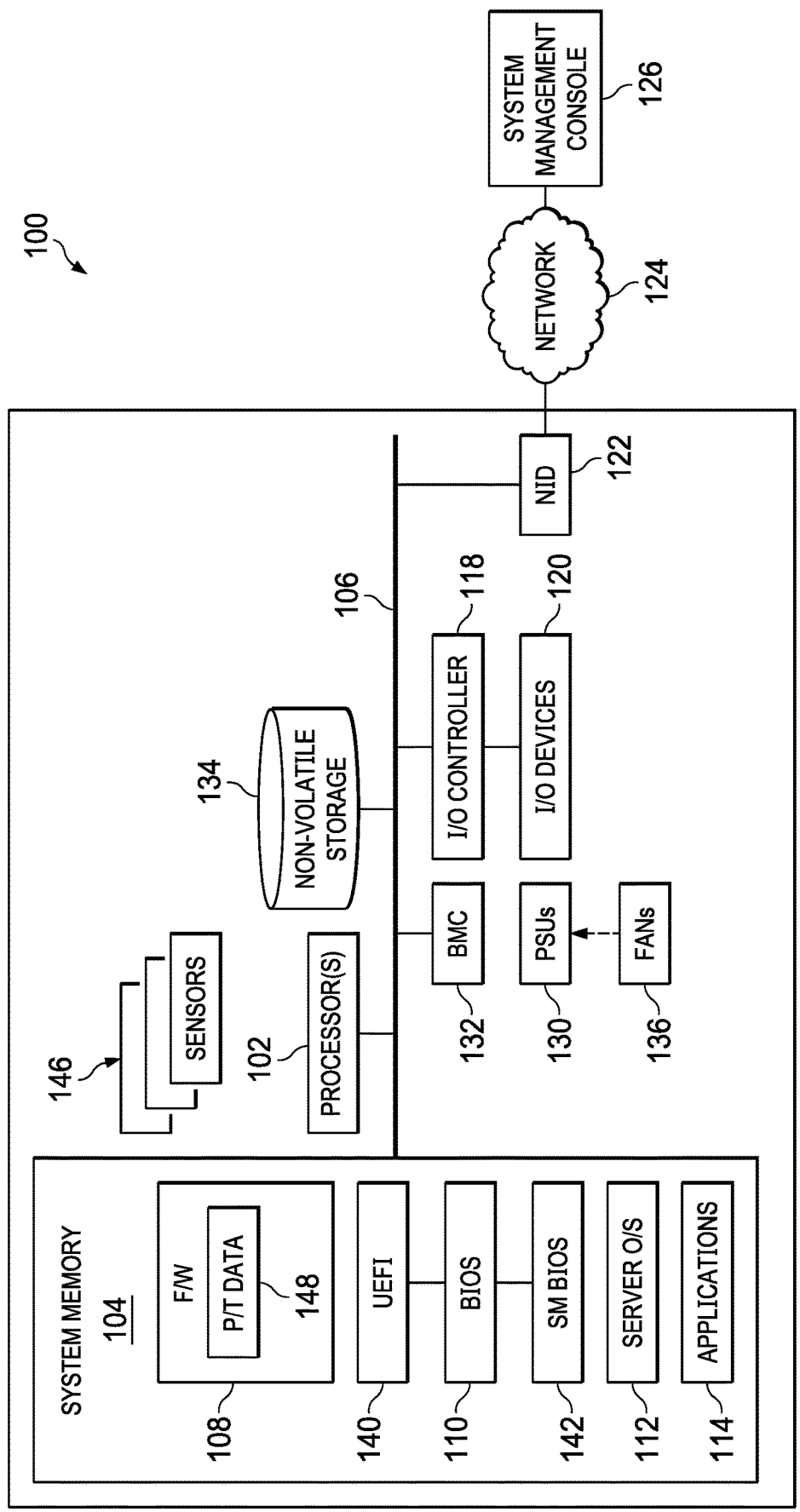
FIG. 1 is a block diagram of examples of components of an Information Handling System (IHS) according to one embodiment of the present disclosure.

Embodiments described herein comprise a data sharing system and method for a baseboard management controller (BMC) that can boot or launch multiple, different firmware stacks on the BMC. The data sharing system provides a technique for synchronizing data that is commonly used by each of multiple BMC firmware stacks in a BMC having a multi-boot environment. Given such features, users of the data sharing system may easily migrate between different types of BMC firmware stacks without requiring re-configuration of the BMC firmware stack settings in some embodiments.

Whereas custom BMC firmware stacks may be created and implemented with little or no control over how the BMC hardware or its associated IHS is configured, they may exhibit certain problems that, if not resolved, can inflict damage to the IHS or even the BMC hardware itself.

Embodiments of the present disclosure provide a solution to this problem, among others, using a system and method that enables switching to another different BMC firmware stack, such as a standard BMC firmware stack, that provides a known good stable operating environment in certain scenarios when the custom BMC firmware stack exhibits problems. Additionally, the multi-boot system and method may provide an advantage in that a different BMC firmware stack may be selectively booted on the BMC to provide functionality that may not be available on the currently running BMC firmware stack.

Certain IHSs may be configured with BMCs that are used to monitor, and in some cases manage computer hardware components of their respective IHSs. A BMC is normally programmed using a firmware stack that configures the BMC for performing out-of-band (e.g., external to a computer's operating system or BIOS) hardware management tasks. The BMC firmware can support industry-standard specifications, such as the Intelligent Platform Management Interface (IPMI) and Systems Management Architecture of Server Hardware (SMASH) for computer system administration.

The BMC firmware is normally proprietary and is often developed by the vendor and shipped along with the BMC to the end user. Nevertheless, industry trends have migrated toward custom BMC firmware stacks (e.g., operating systems) that allow the end user greater control over how the BMC operates. OpenBMC is one example standard under which custom BMC firmware stacks may be generated. In general, openBMC is a collaborative open-source Linux distribution for BMCs meant to work across heterogeneous systems that include enterprise, high-performance computing (HPC), telecommunications, and cloud-scale data centers.

While custom BMC firmware stacks, such as those implemented according to openBMC standards, may provide enhanced manageability, transparency, and customization, its implementation has not been without drawbacks. For example, standard BMC firmware stacks are often implemented by the vendor of the IHS in which the BMC is deployed and therefore, the quality and reliability of the BMC's functionality can be controlled to a relatively good degree. One example of such a standard BMC firmware stack is the iDRAC firmware stack provided by the DELL CORPORATION. On the other hand, custom BMC firmware stacks, which are typically developed in uncontrolled environments, often possess relatively higher levels of software faults (e.g., bugs).

This drawback can be particularly problematic due to the fact that custom BMC firmware stacks are inherently less secure than their standard BMC firmware stack counterparts. For example, custom BMC firmware stacks are typically created by users whose development efforts are not closely controlled by the vendor of the IHS 100 and as such, it may include logic that may not be aware of all the intricacies of the IHS it is designed to manage. Furthermore, such logic can engender security holes that may enable others to breach the security of the BMC or even its host IHS.

Improperly functioning algorithms, whether inadvertent or malicious, can ruin or damage their respective IHSs if not properly mitigated. For example, whereas BMCs may be configured to control the fan speed of any of a number of fans configured in the IHS, either inadvertent or malicious algorithms within the custom BMC firmware stack can cause the fans to turn too slowly, thus yielding an overheating condition which in turn may cause physical damage. As another example, modern day BMCs are often configured with small memory components (e.g., an electronic multimedia card (eMMC)) due to their relatively low cost and small size; nevertheless, excessive read/write cycle rates caused by custom BMC firmware stack algorithms can cause damage to these memory components.

Traditionally, BMCs have been provided with dual BMC firmware stacks to provide a level of redundancy. In the event that a currently executed BMC firmware stack becomes non-functional, for example, a recovery path may be provided by booting to the alternate BMC firmware stack. In such cases, however, both versions of the firmware have been same, even when the BMC firmware stacks are provided from the same vendor. The intent has been to provide redundancy, not diversity that would otherwise be provided by different versions of BMC firmware stacks. With the wider acceptance of openBMC in the industry, it would be beneficial for IHS vendors to provide such diversity to handle scenarios where the openBMC-based BMC firmware stacks are being deployed on their IHSs.

For example, standard BMC firmware stacks (e.g., iDRAC) typically provides a greater level of functionality than provided by their custom BMC firmware stack counterparts. Thus, it would be useful to enable switching between a custom BMC firmware stack and a standard BMC firmware stack so that the advantages of both custom BMC firmware stacks (e.g., manageability, transparency, and customization, etc.) as well as standard BMC firmware stacks (e.g., functionality, reliability, etc.) can be realized. Additionally, from a security standpoint, running dissimilar BMC firmware stacks (e.g., developed from different code bases) warrants protecting one from another during run time. That is, the code and data that one BMC firmware stack generates should be protected from possible tampering by the other BMC firmware stack.

Currently implemented standard BMC firmware stacks and custom BMC firmware stacks generally have differing security models/domains. Allowing both security domains to exists on an IHS should not be allowed to compromise the security level of standard BMC firmware stacks, which is often greater than the security level of custom BMC firmware stacks. Additionally, the security domain of custom BMC firmware stacks should provide data-at-rest protection, which is cryptographically just as strong as the security domain of standard BMC firmware stacks.

While providing a multi-boot BMC with dissimilar BMC firmware stacks may be beneficial, dissimilar BMC firmware stacks with isolated code & data environments often yields problems/challenges with respect to a user's experience when switching between them. For example, common configuration data (e.g., login credentials (username/password), access rights, user preferences, etc.) has been conventionally handled independently by each BMC firmware stack. For example, setting a username/password in one BMC firmware stack is only applied to that BMC firmware stack, not to any other BMC firmware stack that may have been previously installed on the BMC. A rollback to another BMC firmware stack, will have different (presumably previous) username/password login credentials. This can, in some cases, result in poor customer experience, and possible loss of configuration data.

For purposes of this disclosure, an IHS may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, science, control, or other purposes. For example, an IHS may be a personal computer (e.g., desktop or laptop), tablet computer, mobile device (e.g., personal digital assistant (PDA) or smart phone), server (e.g., blade server or rack server), a network storage device, or any other suitable device and may vary in size, shape, performance, functionality, and price.

The IHS may include random access memory (RAM), one or more processing resources such as a central processing unit (CPU) or hardware or software control logic, ROM, and/or other types of nonvolatile memory. Additional components of the IHS may include one or more disk drives, one or more network ports for communicating with external devices as well as various input and output (I/O) devices, such as a keyboard, a mouse, touchscreen and/or a video display. The IHS may also include one or more buses operable to transmit communications between the various hardware components.

FIG. 1 is a block diagram of examples of components of an Information Handling System (IHS), according to some embodiments. Particularly, IHS 100 includes one or more processor(s) 102 coupled to system memory 104 via system interconnect 106. System interconnect 106 may include any suitable system bus. System memory 104 may include a plurality of software and/or firmware modules including firmware (F/W) 108, basic input/output system (BIOS) 110, operating system (O/S) 112, and/or application(s) 114. Software and/or firmware module(s) stored within system memory 104 may be loaded into processor(s) 102 and executed during operation of IHS 100.

F/W 108 may include a power/thermal profile data table 148 that is used to store power profile data and thermal profile data for certain hardware devices (e.g., processor(s) 102, system memory 104, non-volatile storage 134, NID 122, I/O controllers 118, etc.). System memory 104 may include a UEFI interface 140 and/or a SMBIOS interface 142 for accessing the BIOS as well as updating BIOS 110. In general, UEFI interface 140 provides a software interface between an operating system and BIOS 110. In many cases, UEFI interface 140 can support remote diagnostics and repair of computers, even with no operating system installed. SMBIOS interface 142 can be used to read management information produced by BIOS 110 of an IHS 100. This feature can eliminate the need for the operating system to probe hardware directly to discover what devices are present in the computer.

IHS 100 includes one or more input/output (I/O) controllers 118 which manages the operation of one or more connected input/output (I/O) device(s) 120, such as a keyboard, mouse, touch screen, microphone, a monitor or display device, a camera, a microphone, audio speaker(s) (not shown), an optical reader, a universal serial bus (USB), a card reader, Personal Computer Memory Card International Association (PCMCIA) slot, and/or a high-definition multimedia interface (HDMI), which may be included or coupled to IHS 100.

IHS 100 includes Network Interface Device (NID) 122. NID 122 enables IHS 100 to communicate and/or interface with other devices, services, and components that are located externally to IHS 100. These devices, services, and components, such as a system management console 126, can interface with IHS 100 via an external network, such as network 124, which may include a local area network, wide area network, personal area network, the Internet, etc.

IHS 100 further includes one or more power supply units (PSUs) 130. PSUs 130 are coupled to a BMC 132 via an I$^2$C bus. BMC 132 enables remote operation control of PSUs 130 and other components within IHS 100. PSUs 130 power the hardware devices of IHS 100 (e.g., processor(s) 102, system memory 104, non-volatile storage 134, NID 122, I/O controllers 118, etc.). To assist with maintaining temperatures within specifications, an active cooling system, such as one or more fans 136 may be utilized.

IHS 100 further includes one or more sensors 146. Sensors 146 may, for instance, include a thermal sensor that is in thermal communication with certain hardware devices that generate relatively large amounts of heat, such as processors 102 or PSUs 130. Sensors 146 may also include voltage sensors that communicate signals to BMC 132 associated with, for example, an electrical voltage or current at an input line of PSU 130, and/or an electrical voltage or current at an output line of PSU 130.

BMC 132 may be configured to provide out-of-band management facilities for IHS 100. Management operations may be performed by BMC 132 even if IHS 100 is powered off, or powered down to a standby state. BMC 132 may include a processor, memory, and an out-of-band network interface separate from and physically isolated from an in-band network interface of IHS 100, and/or other embedded resources.

In certain embodiments, BMC 132 may include or may be part of a Remote Access Controller (e.g., a DELL Remote Access Controller (DRAC) or an Integrated DRAC (iDRAC)). In other embodiments, BMC 132 may include or may be an integral part of a Chassis Management Controller (CMC).

Figure 2:
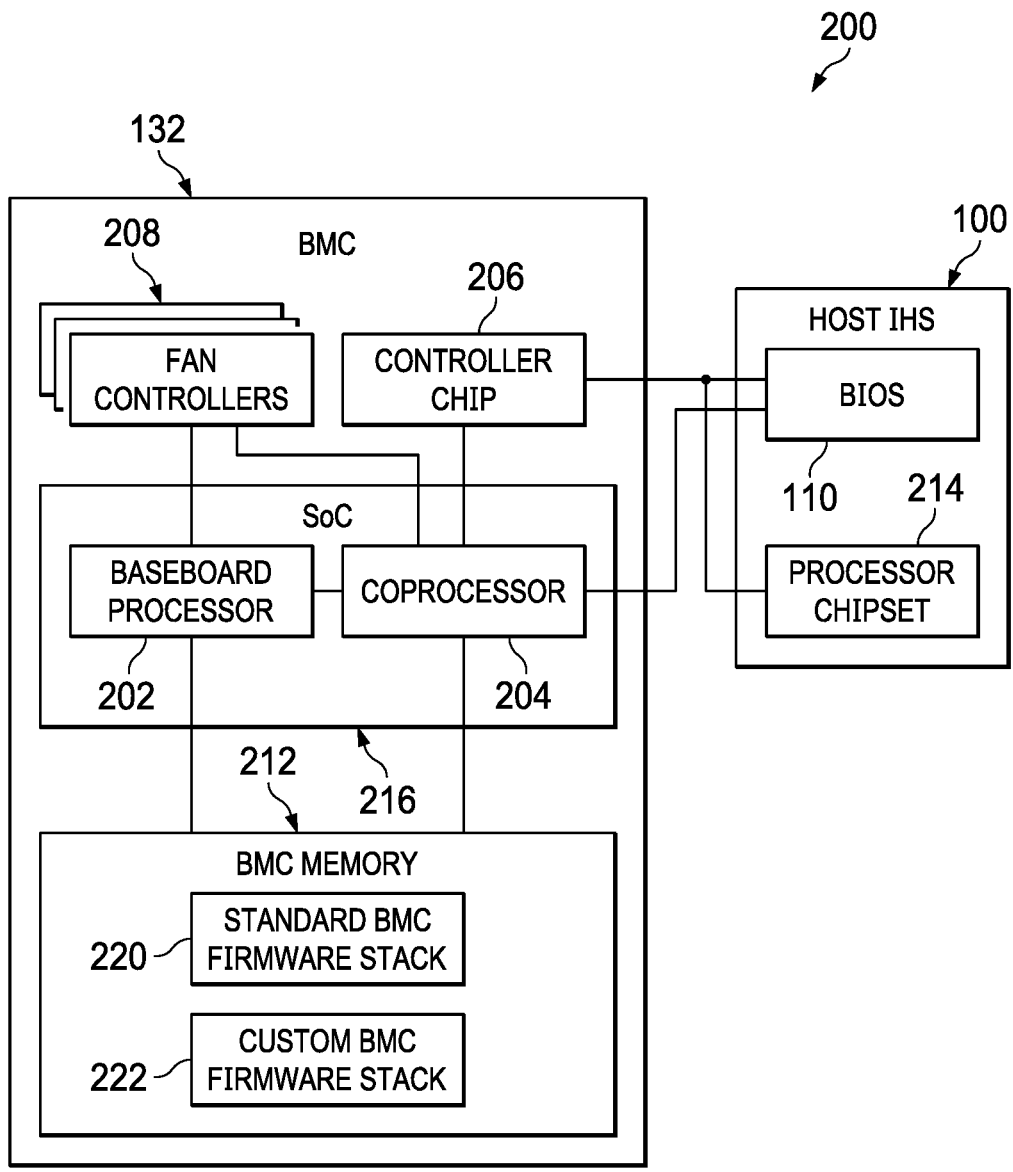
FIG. 2 is a diagram illustrating several components of an example BMC along with those of an associated IHS that may be used to implement a BMC multi-boot system according to one embodiment of the present disclosure.

FIG. 2 is a diagram illustrating several components of an example BMC 132 along with those of an associated IHS 100 that may be used to implement a BMC multi-boot system 200 according to one embodiment of the present disclosure. BMC 132 generally includes a baseboard processor 202, a coprocessor 204, a controller chip 206, one or more fan controllers 208, and a BMC memory 212. The IHS 100 on the other hand, is shown including a BIOS 110, and a processor chipset 214. As shown, the baseboard processor 202 and coprocessor 204 may be provided together in a system on chip device 216. In other embodiments, the baseboard processor 202 and coprocessor 204 may be provided as discreet entities.

As will be described in detail herein below, the BMC memory 212 stores multiple BMC firmware stacks that can be alternatively launched or executed on the BMC 132. A first BMC firmware stack comprising a custom BMC firmware stack 222 may be launched, and after a period of time, halted so that a standard BMC firmware stack 220 may be launched on the BMC 132. The process may be repeated to halt operation of the standard BMC firmware stack 220, and commence execution of the custom BMC firmware stack 222. Although a combination of standard BMC firmware stack 220 and custom BMC firmware stack 222 are shown, it should be appreciated that the system may be configured with any combination of standard and custom BMC firmware stacks. For example, the system may store and execute multiple custom BMC firmware stacks or even multiple standard BMC firmware stacks.

For example, cases exist where it may be beneficial to switchover to a standard BMC firmware stack to perform certain maintenance operations that may not be able to be performed by the previously running BMC firmware stack (e.g., custom BMC firmware stack). One example of such a maintenance operation may include downloading and installing update packages from an online web site, where the standard BMC firmware stack may possess the necessary information for accessing the website as well as providing session login information when the website requires that downloading of certain update packages be conducted from within a login session.

The BMC 132 and IHS 100 are shown with those components described above for purposes of brevity and clarity of discussion, it should be appreciated that either of the BMC 132 and/or IHS 100 may be configured with additional, fewer, or different components without departing from the spirit and scope of the present disclosure.

The BMC memory 212 may integrally formed with the baseboard processor 202, coprocessor 204, and/or controller chip 206, or it may be discreetly separate therefrom. In one embodiment, the BMC memory 212 may be implemented on a memory device (e.g., an electronic multimedia card (eMMC), an electronic universal flash storage (eUFS), or a low-power double data rate (LPDDR) memory device, etc.). Additional details associated with contents stored in the BMC memory 212 will be described in detail herein below.

Baseboard processor 202 may include any suitable type of processor, such as an advanced RISC machine (ARM) processor. Baseboard processor 202 executes a standard BMC firmware stack 220 or a custom BMC firmware stack 222 that is stored in a BMC memory 212. A standard BMC firmware stack may be, for example, an IHS vendor provided firmware stack (e.g., an iDRAC provided by the DELL CORPORATION), while the custom BMC firmware stack 222 may be one created by a user of the IHS, such as one implemented using the openBMC framework. The custom BMC firmware stack 222 may provide out-of-band monitoring and management of the components of the IHS 100. Examples of monitoring functions that the custom BMC firmware stack 222 may provide include, for example, monitoring internal ambient temperatures and/or voltages in the IHS 100, along with monitoring CPU, memory, and network usage levels, and the like. Examples of management features may include installation of software including the base operating system, of the IHS 100, controlling fan speed of one or more fans in the IHS 100, turning certain resources of the IHS 100 on or off, and the like.

Coprocessor 204 functions independently of baseboard processor 202 to assist the ARM processor in performing one or more functions associated with the operation of the BMC. Custom BMC firmware stacks 222 are typically created by users whose development efforts are not closely controlled by the vendor of the IHS 100 and as such, it may include logic that may not be aware of all the intricacies of the IHS 100 it is designed to manage. Thus, the coprocessor 204 may be configured with logic for providing out-of-band monitoring of these custom BMC firmware stacks 222. According to embodiments of the present disclosure, the coprocessor 204 may also be configured to perform certain tests on the baseboard processor 202 to ensure proper operation of the custom BMC firmware stacks 222. Thus, the coprocessor 204 may provide testing capabilities of the baseboard processor 202 regardless of what type of logic that it is implemented with. Additionally, embodiments of the present disclosure may provide test capabilities over other processors configured in the IHS 100, such as the controller chip 206, or other peripheral systems (e.g., PERC controllers, etc.).

Controller chip 206 includes logic for controlling certain features of the IHS 100 and/or BMC 132. In one embodiment, a Complex Programmable Logic Device (CPLD) can be used to implement the controller chip. For example, the controller chip 206 may include logic for, in response to receiving certain input signals, activating or deactivating one or more signals or messages to the baseboard processor 202 and/or coprocessor 204. As another example, the controller chip 206 may include logic for disabling the baseboard processor 202 or coprocessor 204 by holding it in reset so that it cannot boot.

Although FIG. 2 describes one example of a BMC 132 that may be used to implement the multi-boot system, the features of the disclosed BMC 132 may be embodied in other specific forms without deviating from the spirit and scope of the present disclosure. For example, the BMC 132 may perform additional, fewer, or different components than those operations as described in the present example. In a particular example, the BMC 132 may be void of any coprocessor 204, controller chip 206, or fan controllers 208 if not needed or desired. Additionally, the controller chip 206 may be configured on the IHS 100 external to the BMC 132.

Figure 3:
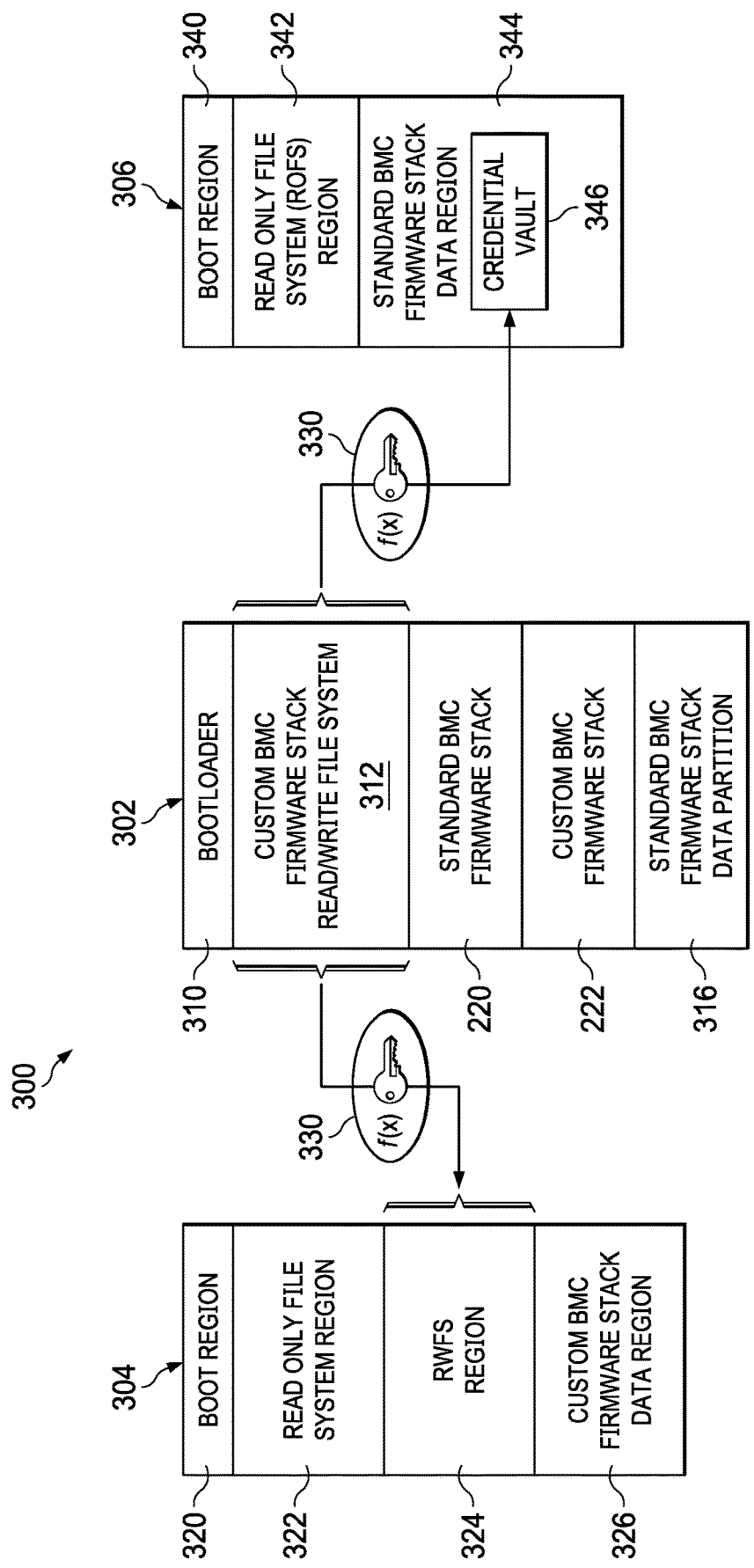
FIG. 3 illustrates an example memory map architecture that may be provided by the data sharing system according to one embodiment of the present disclosure.

FIG. 3 illustrates an example memory map architecture 300 that may be provided by the data sharing system according to one embodiment of the present disclosure. The memory map architecture 300 generally includes a non-volatile storage memory map 302, a custom BMC firmware stack RAM storage memory map configuration 304, and a standard BMC firmware stack RAM storage configuration 306. The non-volatile storage memory map 302, for example, may represent an arrangement of certain components of the data sharing system in the BMC memory 212. The custom BMC firmware stack RAM storage memory map configuration 304 and standard BMC firmware stack RAM storage configuration 306, on the other hand, indicate the arrangement of certain components stored in the RAM portion of the BMC 132 during runtime for each of the custom BMC firmware stack 222 and standard BMC firmware stack 220, respectively.

The non-volatile storage memory map 302 includes a bootloader 310, a custom BMC firmware stack read/write file system (RWFS) 312, standard BMC firmware stack 220, custom BMC firmware stack 222, and a standard BMC firmware stack data partition 316. The standard BMC firmware stack data partition 316 is used to store data associated with operation of the standard BMC firmware stack 220. Examples of such types of data may include BMC settings, IHS settings, working variables, status information, telemetry data, and the like.

Although the non-volatile storage memory map 302 is shown herein having a custom BMC firmware stack 222 and a standard BMC firmware stack 220, it should be appreciated that the non-volatile storage memory map 302 may store other types and combinations of BMC firmware stacks without departing from the spirit and scope of the present disclosure. For example, the non-volatile storage memory map 302 may store two custom BMC firmware stacks 222, such as may be the case where the user desires to execute different versions of the same custom BMC firmware stack's base code. Additionally, it is contemplated that the non-volatile storage memory map 302 may include storage for three or more BMC firmware stacks 312, 314 that can alternatively be executed by the BMC 132. For example, different versions of a BMC firmware stack base code may refer to a first version (e.g., version 1.0) that was released with a certain set of features, and a second version (e.g., version 2.1) that was released at a later point in time to fix certain bugs and/or incorporate one or more new features not present in the earlier release (version 1.0). Furthering this example, generating the second version (e.g., version 2.1) would often entail adding to and/or changing the executable instructions that were used to generate the first version (e.g., version 1.0).

The bootloader 310 is typically stored in a separate partition commonly referred to as a master boot record (MBR). The bootloader 310 may include any type of executable code for launching or booting the custom BMC firmware stack 222 and standard BMC firmware stack 220 on the BMC 132. In one embodiment, the bootloader 310 includes a Universal boot loader (Das U-Boot), which is provided under an open source license, and is primarily used in embedded processor devices to bootstrap the BMC firmware stack's operating system's kernel.

The custom BMC firmware stack RAM storage memory map configuration 304 is generated when the custom BMC firmware stack 222 is launched. The custom BMC firmware stack RAM storage memory map configuration 304 generally includes a boot region 320, read only file system (ROFS) region 322, a RWFS region 324, and a custom BMC firmware stack data region 326. The boot region 320 includes executable logic for communicating with the bootloader 310 to commence operation of the custom BMC firmware stack 222. The ROFS region 322 includes executable logic for performing the various functions of the custom BMC firmware stack 222. The custom BMC firmware stack data region 326 stores data (e.g., BMC/IHS settings, working variables, status information, BMC or IHS telemetry data, etc.) associated with the operation of the custom BMC firmware stack 222.

According to embodiments of the present disclosure, the RWFS 312 is configured to store data that is commonly used by both custom BMC firmware stack 222 and standard BMC firmware stack 220 in encrypted form. In one embodiment, the RWFS 312 may be encrypted with a key, such as a derived handover root key (HRK) 330, to reduce or eliminate potential tampering with the stored data. When the custom BMC firmware stack 222 is initially launched, the bootloader 310 (e.g., via initramfs process) unlocks or decrypts the data stored in RWFS 312 (e.g., via dm-crypt process), and mounts it in the RWFS region 324. Thus, the data stored in the RWFS 312 is only available when the custom BMC firmware stack 222 is currently being executed, and only from the RWFS region 324. The custom BMC firmware stack data region 326 is used by the custom BMC firmware stack 222 for storing and providing configuration data for its operation such as described herein.

The standard BMC firmware stack RAM storage configuration 306 indicates the arrangement of BMC RAM when the standard BMC firmware stack 220 is launched. The standard BMC firmware stack RAM storage configuration 306 generally includes a boot region 340, a read only file system (ROFS) region 342, and a standard BMC firmware stack data region 344. The standard BMC firmware stack RAM storage configuration 306 also includes a credential vault (CV) 346. Whereas the custom BMC firmware stack 222 accesses the configuration data from the RWFS 312, the standard BMC firmware stack 220 accesses the common configuration data from the credential vault 346.

When the standard BMC firmware stack 220 is initially launched, the standard BMC firmware stack 220 starts the credential vault 346 by default, and mounts the RWFS 312, such as by executing a script that performs the 'dm-crypt' command to mount the contents of the RWFS 312 in the credential vault 346. Additionally, the bootloader 310 provides the derived HRK 330 to the standard BMC firmware stack 220 so that it has read and write access to the contents of the credential vault 346. Thus, when the standard BMC firmware stack 220 is started following execution of the custom BMC firmware stack 222, the standard BMC firmware stack 220 may access the security-based data used by the custom BMC firmware stack 222 by accessing the credential vault 346. Additionally, the custom BMC firmware stack 222 may access the configuration data used by the standard BMC firmware stack 220 when it is subsequently started by accessing the configuration data via the RWFS 312.

In one embodiment, the bootloader 310 includes logic for hiding (obfuscating) the BMC firmware stack that is not currently being executed from the other BMC firmware stack that is currently being executed. In another embodiment, the bootloader 310 may include logic for enforcing certain access policies associated with the BMC firmware stack currently being executed. For example, since a standard BMC firmware stack 220 mostly includes logic that is developed by the vendor, and thus well controlled, the bootloader 310 may allow the standard BMC firmware stack 220 to have relatively free access to the code region (e.g., custom BMC firmware stack boot section 306, ROFS 308) associated with the custom BMC firmware stack 222. Because the logic of the custom BMC firmware stack 222 may be inherently less controlled, however, the bootloader 310 may be configured with policies to restrict the custom BMC firmware stack 222 from having access to the code region (e.g., standard BMC firmware stack 220, and standard BMC firmware stack data section 316) associated with the standard BMC firmware stack 220. Additionally, the bootloader 310 may be configured with policies for restricting access to certain portions of the other non-used BMC firmware stack storage areas. For example, the bootloader 310 may include polices for restricting a currently executed BMC firmware stack to only the standard BMC firmware stack data section 316 while allowing access to the standard BMC firmware stack 220 in some scenarios.

Figure 4:
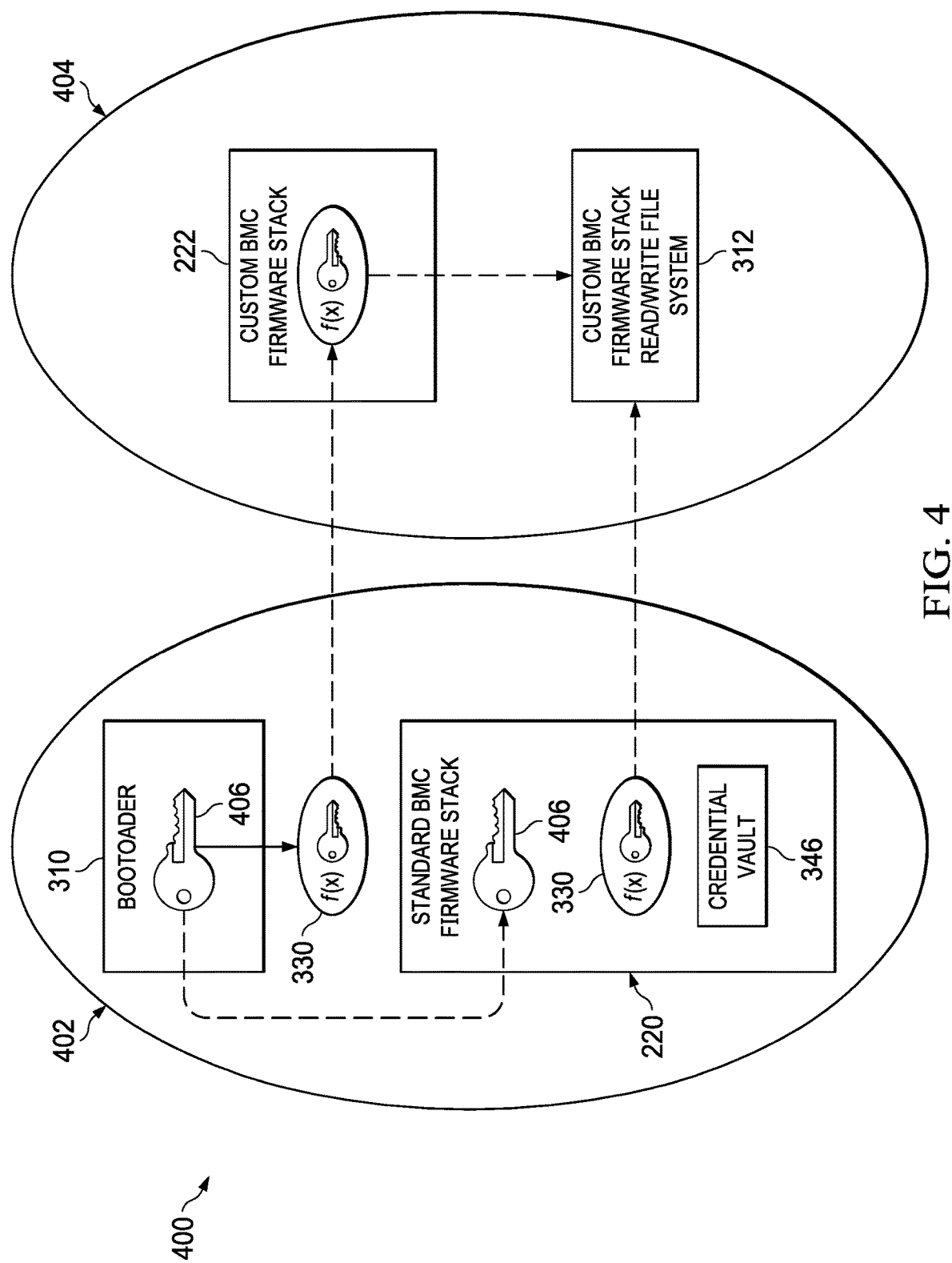
FIG. 4 shows a diagram illustrating how a security level of a standard BMC firmware stack security domain and a custom BMC firmware stack security domain may be maintained according to one embodiment of the present disclosure.

FIG. 4 shows a diagram 400 illustrating how a security level of a standard BMC firmware stack security domain 402 and a custom BMC firmware stack security domain 404 may be maintained according to one embodiment of the present disclosure. As described above, the standard BMC firmware stack security domain 402 is generally more secure for various reasons, such as a relatively tighter coupling between the development of the BMC firmware stack and the host IHS in which it is deployed; a feature that a custom BMC firmware stack cannot inherently possess. Nevertheless, use of the custom BMC firmware stack 222 should not reduce the native security level of the standard BMC firmware stack security domain 402, nor of the host IHS 100 on which it is implemented. To accomplish this, the bootloader 310 stores a key 406 that is provided for use by the standard BMC firmware stack 220, but not the custom BMC firmware stack 222. Access to the RWFS 312, rather, is provided by a derived HRK 330, which is generated by the bootloader 310.

In one embodiment, the derived HRK 330 is generated using a unique identifier (e.g., serial number) of the BMC 132 so that the derived HRK 330 is unique to each BMC 132 on which it is implemented. The RWFS 312 is encrypted with this derived HRK 330 so that only it can be used to decrypt the contents stored therein. The bootloader 310 provides the HRK 406 to the standard BMC firmware stack 220 so that it can generate its own derived HRK 330 for accessing the contents of the credential vault 346. Because the HRK 406 is provided to the standard BMC firmware stack 220, it can access the contents of the custom BMC firmware stack 222, such as by accessing the contents of the custom BMC firmware stack 222 for various monitoring purposes. The custom BMC firmware stack 222, however, only possesses the derived HRK 330 and as such, is inhibited from accessing any portion of the standard BMC firmware stack security domain 402. Thus, the security domain 402 of the standard BMC firmware stack 220 is maintained despite any nefarious actions that could potentially be taken by the custom BMC firmware stack 222.

In one embodiment, the HRK 406 is generated to include a digital signature of an administrator of the IHS/BMC combination so that any logfiles generated in conjunction with the use of the BMC 132 may be attestable to the administrator of the IHS/BMC combination. The administrator may be any entity that oversees, guarantees, or warranties the operation of the IHS 100 and/or BMC 132, such as a vendor that assembled, manufactured, sold, or otherwise provided the IHS 100 and/or BMC 132 to the user. For example, the BMC 132 may be configured to continually log events during its operation in which the logged events may be stored in a logfile for retrieval and analysis at a later point in time. In one embodiment, the logged events may be retrieved remotely, such as using network 124 via network interface device 122. Thus, the administrator may be provided with the ability to properly administer warranty policies or other contractual agreements(s) for the IHS 100 based on the manner in which the IHS 100 was used by the user due to the integrity of the security domain 402 provided by the HRK 406.

Figure 5:
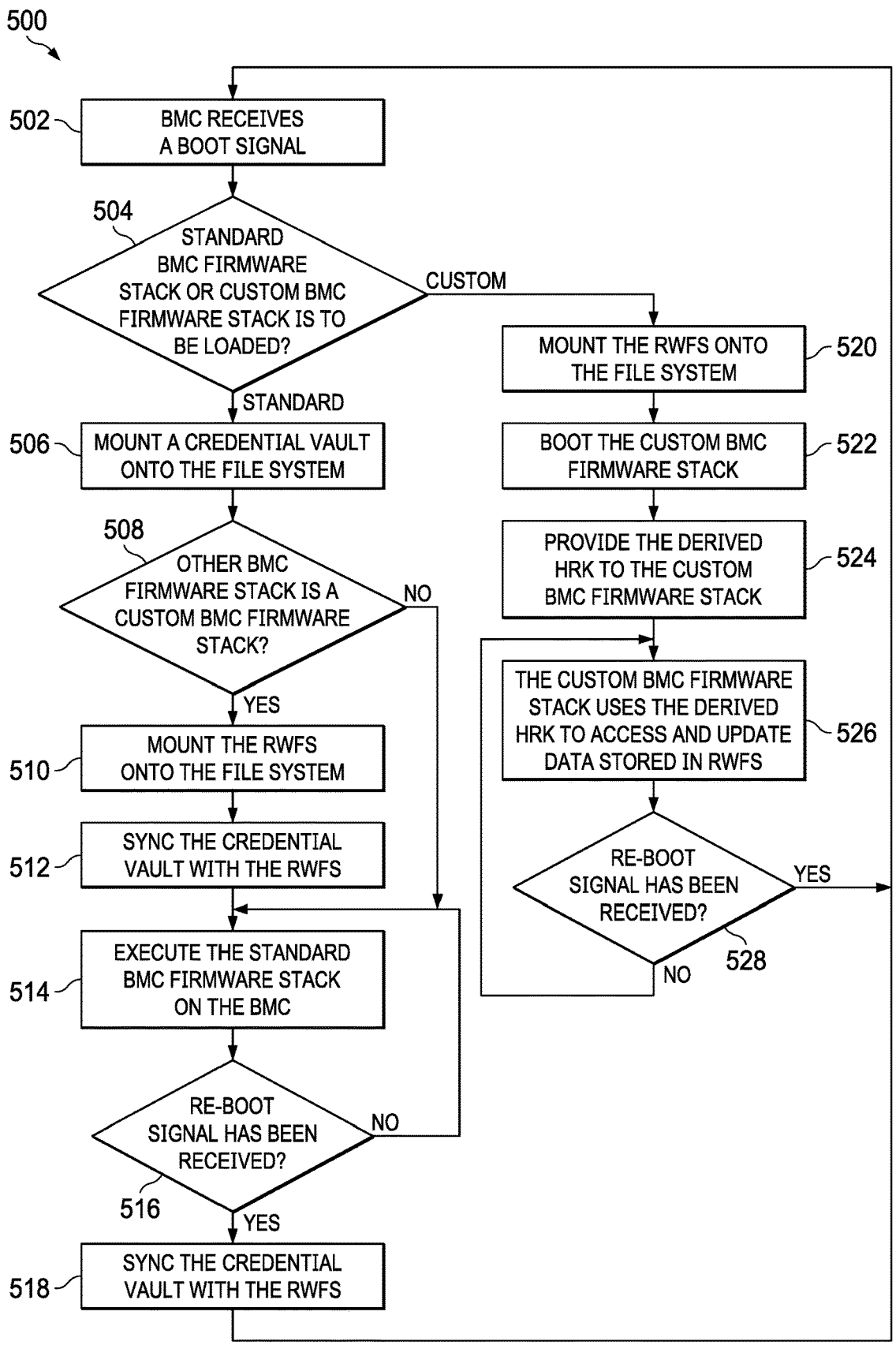
FIG. 5 illustrates an example data sharing and synchronization method that may be performed to enable sharing of configuration data between BMC firmware stacks of different types according to one embodiment of the present disclosure.

FIG. 5 illustrates an example data sharing and synchronization method 500 that may be performed to enable sharing of configuration data between BMC firmware stacks of different types according to one embodiment of the present disclosure. In one embodiment, the method 500 may be performed each time the BMC 132 is initially booted after the BMC 132 is powered on, such as when its host IHS 100 is re-booted. Additionally or alternatively, some, most, or all steps of the method 500 may be performed by the bootloader 310 stored in the BMC memory 212.

At step 502, the BMC 132 receives a boot signal, such as in response to a power on condition. Thereafter at step 504, the method 500 determines whether a standard BMC firmware stack 220 or a custom BMC firmware stack 222 is to be loaded (e.g., launched) on the BMC 132. If a standard BMC firmware stack 220 is to be loaded, processing continues at step 506; otherwise, if a custom BMC firmware stack 222 is to be loaded, processing continues at step 520.

At step 506, the method 500 mounts a credential vault 346 onto the file system. Thereafter at step 508, the method 500 determines whether or not the other BMC firmware stack stored in the BMC memory 212 is a custom BMC firmware stack 222. If so, processing continues at step 510; otherwise, processing continues at step 514 in which booting and subsequent execution of the standard BMC firmware stack 220 is conducted in the normal manner. If, however, the other BMC firmware stack is a custom BMC firmware stack 222, the method 500 mounts the RWFS 312 onto the file system at step 510, and syncs the credential vault 346 with the RWFS 312 at step 512. The action of syncing the credential vault 346 with the RWFS 312 generally entails copying of the contents of the RWFS 312 to the credential vault 346. In some cases, the data may be converted into a format that is compatible with the standard BMC firmware stack 220. Thereafter at step 514, the standard BMC firmware stack 220 is booted on the BMC 132. At this point, the standard BMC firmware stack 220 is executed on the BMC 132 in the normal manner.

At step 516, the method 500 determines whether or a re-boot signal is received. If not, processing continues at step 514 to continue executing the standard BMC firmware stack 220. However, if a re-boot signal has been received, processing continues at step 518 to synchronize the credential vault 346 with the RWFS 312. The credential vault 346 can be synchronized in a manner similar to how it was synchronized at step 512. Once the credential vault 346 is synchronized with the RWFS 312 processing continues at step 502 to re-boot the BMC 132.

Thus, as can be seen, the standard BMC firmware stack 220 maintains synchronization because it possesses the HRK 406 for simultaneously accessing the credential vault 346 and RWFS 312. Accordingly, synchronization can be maintained while ensuring that the security level of the standard BMC firmware stack security domain 402 is not reduced.

Steps 520-528 generally describe actions that may be taken by the method 500 to load and execute a custom BMC firmware stack 222 on the BMC 132. At step 520, the method 500 mounts the RWFS onto the file system. For example, the RWFS 312 may be mounted using a 'dm-crypt' command from within an 'initramfs' process of the bootloader 310. When the custom BMC firmware stack 222 has been successfully booted at step 522, the derived HRK 330 may be provided to the custom BMC firmware stack 222 at step 524. In one embodiment, the bootloader 310 may generate the derived HRK 330 from the HRK 406 each time the derived HRK 330 is accessed. Generation of the derived HRK 330 each time it is accessed may increase the security of the system by reducing the possibility of spoofing or changing of the HRK 406 by an external source. Additionally, generating a new derived HRK 330 each time it is accessed may reduce the probability that the derived HRK 330 is spoofed on a different BMC 132 because the derived HRK 330 is a function of the unique identity of the BMC 132.

At step 526, the custom BMC firmware stack uses the derived HRK 330 to access and update data stored in RWFS 312. At this point, the custom BMC firmware stack 222 is executed on the BMC 132 in the normal manner. Nevertheless, if the method determines that a re-boot signal has been received at step 528, processing continues at step 502 to process the received re-boot signal. Otherwise, processing continues at step 526 to continue execution of the custom BMC firmware stack 222 on the BMC 132.

The method 500 described above may be repeatedly performed each time the BMC 132 is re-booted. Nevertheless, when use of the method 500 is no longer needed or desired, the method 500 ends.

Although FIG. 5 describes one example of a method that may be performed to share configuration data among multiple BMC firmware stacks of a BMC 132, the features of the disclosed process may be embodied in other specific forms without deviating from the spirit and scope of the present disclosure. For example, the method 500 may perform additional, fewer, or different operations than those operations as described in the present example. As another example, certain steps of the aforedescribed process may be performed by other components of the BMC 132 and/or IHS 100, such as by certain processes other than the bootloader 310 executed on the BMC 132 or its host IHS 100.

Figure 6:
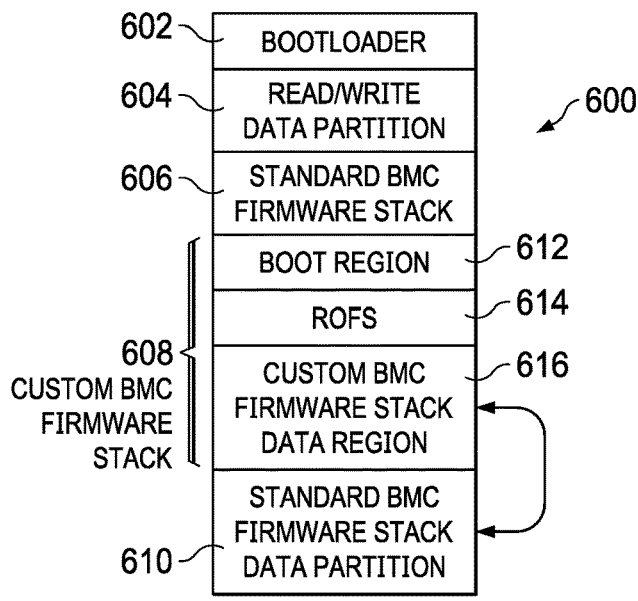
FIG. 6 illustrates another example memory map that may be provided by the data sharing system to store and execute a custom BMC firmware stack and a standard BMC firmware stack according to one embodiment of the present disclosure.

FIG. 6 illustrates another example memory map 600 that may be provided by the data sharing system to store and execute a custom BMC firmware stack 222 and a standard BMC firmware stack 220 according to one embodiment of the present disclosure. The memory map 600 generally indicates an arrangement of certain components of the data sharing system that may be stored in the BMC memory 212. The memory map 600 includes a bootloader 602, a read/write data partition 604, a standard BMC firmware stack 606, a custom BMC firmware stack 608, and a standard BMC firmware stack data partition 610 that are each similar in design and construction to the bootloader 310, standard BMC firmware stack 220, custom BMC firmware stack 222, and standard BMC firmware stack data partition 316 as shown and described above with respect to FIG. 3. The custom BMC firmware stack 222, however, is shown herein having a boot region 612, a ROFS 614, and a custom BMC firmware stack data region 616.

The custom BMC firmware stack boot region 616 generally refers to a code segment associated with the custom BMC firmware stack 608 that is pointed to by the bootloader 602. That is, when the bootloader 602 launches the custom BMC firmware stack 608, it instructs the baseboard processor 202 to commence execution at the custom BMC firmware stack boot region 612 so that it can perform certain operations or procedures for preparing the custom BMC firmware stack 608 to be executed on the baseboard processor 202. The ROFS 614 generally includes business logic (e.g., static firmware) for performing the various tasks of the custom BMC firmware stack 608.

The custom BMC firmware stack data region 616 stores data associated with the operation of the custom BMC firmware stack 608. Examples of types of data that may be stored by the custom BMC firmware stack data region 616 include BMC settings (e.g., fan speed), IHS settings, working variables, status information, BMC or IHS telemetry data, login session information, and the like. It would be beneficial to share such information with another second BMC firmware stack configured in a multi-boot environment provided for the BMC 132. As such, the data sharing system is configured to synchronize or copy the current contents of one data partition (e.g., the custom BMC firmware stack data region 616 or the standard BMC firmware stack 606) to the other data partition whenever a switchover occurs.

In one embodiment, the destination BMC stack firmware data partition along with the data from the currently running BMC firmware stack is rebuilt whenever there is a transition between the two dissimilar stacks. For example, the BMC 132 may be running standard BMC firmware stacks on both sides to start with. Whenever a transition to a custom BMC firmware stack is initiated, the new firmware code is copied to its respective partitions and towards the end of the firmware update process, the custom BMC firmware stack data region 616 is constructed from scratch by copying data (e.g., files, records, database(s), etc.) from the standard BMC firmware stack data partition 610. Generally, such data is more than likely used by the custom BMC firmware stack 608 anyway. As the custom BMC firmware stack 608 boots for the first time, such as after a firmware update process, it would have the data partition already created and pre-populated for its use. With this solution, the switchover to the custom BMC firmware stack 608 may provide a seamless experience for the user. That is, the user will not see any differences in the firmware data content between the two BMC firmware stacks. Similarly, when transitioning from a BMC configuration installed with custom BMC firmware stacks 608 on both sides to another having a standard BMC firmware stack 606 on one side, the update process constructs a minimal standard BMC firmware stack data partition 610 with certain commonly used data between these two firmware stacks.

The firmware data partition build process can occur either when the firmware update process is performed, or when the BMC 132 is booted the next time. For example, when a newly updated BMC firmware stack is booting, it could read the common files from opposite side's data partition to create and populate its own data partition. The firmware data contents could also be attested by the derived HRK 330 that is accessible only by the standard BMC firmware stack 606 and custom BMC firmware stack 608. This may provide for a more secure standard BMC firmware stack domain 402 to trust the contents provided by the less secure custom BMC firmware stack domain 404, particularly when transitioning from a custom BMC firmware stack 608 to a standard BMC firmware stack 606. In one embodiment, attestation may be provided by signing a md5 sum with the derived HRK 330 to generate a md5sum file. In this manner, the other BMC firmware stack data would be verified by decrypting the md5sum file and verifying the checksum against the copied file.

Figure 7:
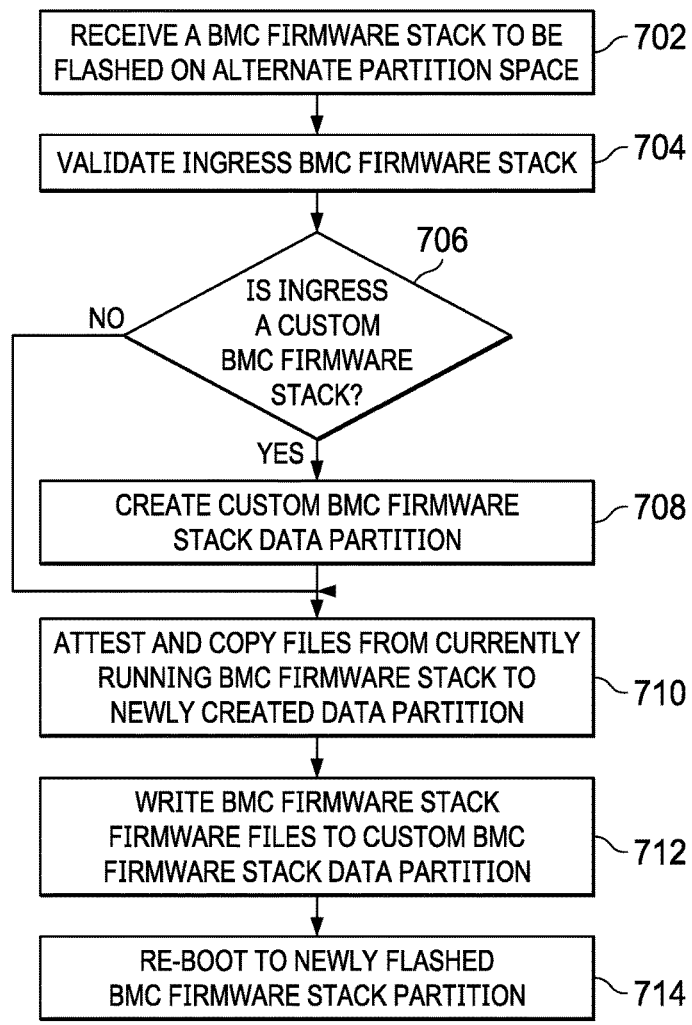
FIG. 7 illustrates an example BMC firmware stack firmware update method that may be performed to install or flash a new BMC firmware stack image according to one embodiment of the present disclosure.

FIG. 7 illustrates an example BMC firmware stack firmware update method 700 that may be performed to install or flash a new BMC firmware stack image according to one embodiment of the present disclosure. Such a scenario may exist when the user desires to provide a multi-boot BMC environment having both custom and standard BMC firmware stacks, a multi-boot BMC environment having two custom BMC firmware stacks, or a multi-boot BMC environment having two standard BMC firmware stacks. Additionally or alternatively, some, most, or all steps of the method 700 may be performed by the bootloader stored in the BMC memory 212.

At step 702, the method 700 receives an ingress BMC firmware stack to be flashed on the alternate partition space. Herein, the alternate partition space generally refers to the partition space that is not currently being executed on the BMC 132. At step 704, the method 700 validates the ingress BMC firmware stack. The ingress BMC firmware stack, for example, may be encrypted with a digital signature (HRK 330) signed by the vendor. The method 700, therefore, may verify that the digital signature is valid to reduce any possibility of malware being inadvertently introduced onto the BMC 132.

At step 706, the method 700 determines whether or the ingress BMC firmware stack is a custom BMC firmware stack. If so, processing continues at step 708 to create a new BMC firmware stack data partition for the ingress BMC firmware stack; otherwise processing continues at step 710. Thereafter at step 710, the method 700 attests and copies files from the data partition of the currently running BMC firmware stack to the newly create data partition. The method 700 then writes the ingress BMC firmware stack firmware files to the custom BMC firmware stack data partitions at step 712, and re-boots to the newly flashed BMC firmware stack partition at step 714.

Thus as can be clearly seen, the method 700 can be used to flash custom as well as standard BMC firmware stack images to reside on the BMC 132 concurrently with a standard BMC firmware stack 220. Nevertheless, when use of the method 700 is no longer needed or desired, the method 700 ends.

Although FIG. 7 describes one example of a method that may be performed to flash a new ingress BMC firmware stack onto a BMC 132 operating with a multi-boot environment, the features of the disclosed process may be embodied in other specific forms without deviating from the spirit and scope of the present disclosure. For example, the method 700 may perform additional, fewer, or different operations than those operations as described in the present example. As another example, certain steps of the aforedescribed process may be performed by other components of the BMC 132 and/or IHS 100, such as by certain processes other than the bootloader 310 executed on the BMC 132 or its host IHS 100.

Figure 8:
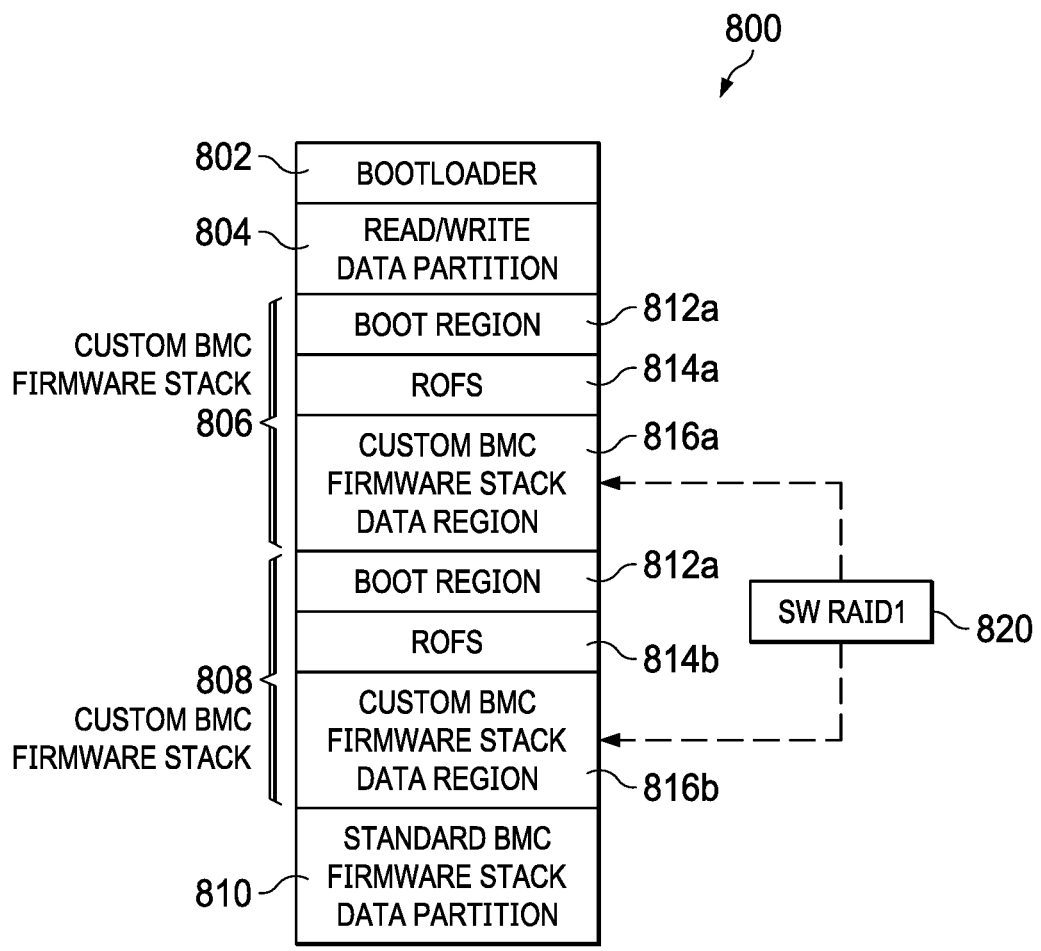
FIG. 8 illustrates another example memory map that may be provided by the data sharing system to store and execute two custom BMC firmware stacks according to one embodiment of the present disclosure.

FIG. 8 illustrates another example memory map 800 that may be provided by the data sharing system to store and execute two custom BMC firmware stacks according to one embodiment of the present disclosure. In one embodiment, the memory map 800 generally indicates an arrangement of certain components of the data sharing system that may be stored in the BMC memory 212. The memory map 800 includes a bootloader 802, a read/write data partition 804, and two custom BMC firmware stacks 806 and 808, and a standard BMC firmware stack data partition 810. The bootloader 802, read/write data partition 804, custom BMC firmware stack 808, and standard BMC firmware stack data partition 810 are each similar in design and construction to the bootloader 602, standard BMC firmware stack 606, and standard BMC firmware stack data partition 610 as shown and described above with respect to FIG. 6. The memory map 800 differs, however, in that it includes a second custom BMC firmware stack 806 as opposed to the standard BMC firmware stack 606 as described above with respect to FIG. 6. Additionally, each custom BMC firmware stack 806 and 808 is shown herein having a boot region 812a and 812b, a ROFS 814a and 814b, and a custom BMC firmware stack data region 816a and 816b.

Operating a BMC 132 in a multi-boot environment in which both BMC firmware stacks are custom BMC firmware stacks leads to two separate partitions on either side. But to provide a seamless transition from one BMC firmware stack to the other, the data region 816a or 816b of the currently running custom BMC firmware stack 806 or 808 should be synchronized before switching over to the other custom BMC firmware stack. Therefore, a software RAID1 configuration 820 may be provided between the data partitions 816a and 816b so that the data partition 816a or 816b of the destination custom BMC firmware stack may be synchronized with the data partition 816a or 816b of the currently running custom BMC firmware stack. The RAID1 configuration 820 generally refers to a type of redundancy in which two disks or partitions are configured to store an exact copy or mirror of the data that is stored. Thus, the data sharing system provides seamless switchover between two BMC firmware stacks regardless of whether the originating BMC firmware stack is a standard or a custom BMC firmware stack as well as whether the destination BMC firmware stack is a standard or a custom BMC firmware stack. That is, the firmware data of the originating BMC firmware stack is preserved for use by the destination BMC firmware stack regardless of the type (custom or standard) of BMC firmware stack that is deployed on the BMC 132.

Figure 9:
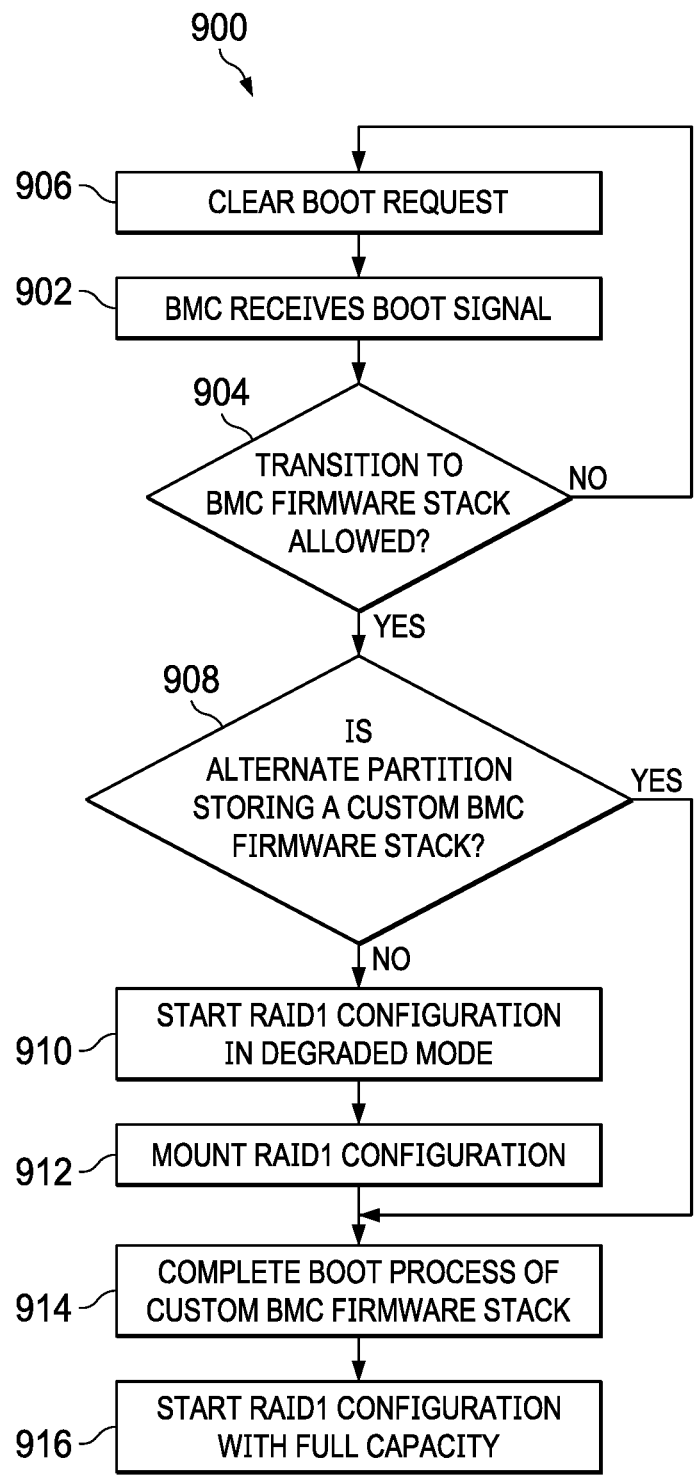
FIG. 9 illustrates an example BMC firmware stack firmware update method that may be performed to boot a custom BMC firmware stack on a BMC according to one embodiment of the present disclosure.

FIG. 9 illustrates an example BMC firmware stack firmware update method 900 that may be performed to boot a custom BMC firmware stack 222 on a BMC 132 according to one embodiment of the present disclosure. Scenarios may exist when the user desires to provide a multi-boot BMC environment flashed with two different custom BMC firmware stacks. For example, the user may desire to have different versions of a custom BMC firmware stack concurrently installed on the BMC 132 for various reasons, such as for testing purposes. As will be described in detail herein below, embodiments of the present disclosure provide a method for continually synchronizing the data partitions of each custom BMC firmware stack with one another so that the operating environment of the BMC 132 remains relatively constant regardless of which custom BMC firmware stack is currently being executed. Additionally or alternatively, some, most, or all steps of the method 900 may be performed by the bootloader stored in the BMC memory 212.

At step 902, the BMC 132 receives a boot signal to boot a custom BMC firmware stack, such as in response to a power on condition or based on user input to boot the custom BMC firmware stack. Thereafter at step 904, the method 500 determines whether booting of the custom BMC firmware stack is allowed. For example, the method 900 may verify whether the BMC 132 has been licensed to boot the custom BMC firmware stack based upon license information obtained from the credential vault as described herein above. If so, processing continues at step 908; otherwise, processing continues at step 906 where the boot request is cleared, and the method continues at step 902 to await receipt of another boot signal.

At step 908, the method 900 determines if the alternate partition is currently storing another custom BMC firmware stack. The alternate partition generally refers to the partition that stores the BMC firmware stack which is not currently being booted. If so, processing continues at step 914; otherwise, processing continues at step 910.

At step 910, the method 900 starts the RAID-1 configuration 820 in a degraded mode. The degraded mode of operation generally refers to a fallback mode of operation in which the RAID-1 array may continue to be used, but without any secondary storage, which in this particular case would be the data partition of the other not currently running BMC firmware stack. The method 900 then mounts the RAID-1 configuration at step 912, and completes the boot process of the custom BMC firmware stack at step 914.

If however, the alternate partition is currently storing another custom BMC firmware stack, then the RAID-1 configuration 820 can be started in full capacity mode at step 916. That is, RAID-1 configuration can be used in full capacity mode to continually synchronize the data partitions of each custom BMC firmware stack while the custom BMC firmware stack is being used. Thereafter, the boot process may be completed at step 914.

The aforedescribed method may be performed each time a custom BMC firmware stack is booted on the BMC 132. Nevertheless, when use of the method 900 is no longer needed or desired, the method 900 ends.

Although FIG. 9 describes one example of a method that may be performed to boot a custom BMC firmware stack on a BMC 132 operating with a multi-boot environment, the features of the disclosed process may be embodied in other specific forms without deviating from the spirit and scope of the present disclosure. For example, the method 900 may perform additional, fewer, or different operations than those operations as described in the present example. As another example, certain steps of the aforedescribed process may be performed by other components of the BMC 132 and/or IHS 100, such as by certain processes other than the bootloader 310 executed on the BMC 132 or its host IHS 100.

It should be understood that various operations described herein may be implemented in software or software modules executed by logic or processing circuitry, hardware, or a combination thereof. The order in which each operation of a given method is performed may be changed, and various operations may be added, reordered, combined, omitted, modified, etc. It is intended that the invention(s) described herein embrace all such modifications and changes and, accordingly, the above description should be regarded in an illustrative rather than a restrictive sense.

Although the invention(s) is/are described herein with reference to specific embodiments, various modifications and changes can be made without departing from the scope of the present invention(s), as set forth in the claims below. Accordingly, the specification and figures are to be regarded in an illustrative rather than a restrictive sense, and all such modifications are intended to be included within the scope of the present invention(s). Any benefits, advantages, or solutions to problems that are described herein with regard to specific embodiments are not intended to be construed as a critical, required, or essential feature or element of any or all the claims.

Unless stated otherwise, terms such as "first" and "second" are used to arbitrarily distinguish between the elements that such terms describe. Thus, these terms are not necessarily intended to indicate temporal or other prioritization of such elements. The terms "coupled" or "operably coupled" are defined as connected, although not necessarily directly, and not necessarily mechanically. The terms "a" and "an" are defined as one or more unless stated otherwise. The terms "comprise" (and any form of comprise, such as "comprises" and "comprising"), "have" (and any form of have, such as "has" and "having"), "include" (and any form of include, such as "includes" and "including") and "contain" (and any form of contain, such as "contains" and "containing") are open-ended linking verbs. As a result, a system, device, or apparatus that "comprises," "has," "includes" or "contains" one or more elements possesses those one or more elements but is not limited to possessing only those one or more elements. Similarly, a method or process that "comprises," "has," "includes" or "contains" one or more operations possesses those one or more operations but is not limited to possessing only those one or more operations.

The invention claimed is:

1. An information handling system (IHS), comprising:
a plurality of hardware devices; and
a baseboard management controller (BMC) in communication with the plurality of hardware devices, the BMC simultaneously storing a standard firmware stack and a custom firmware stack, the BMC comprising one or more processors and one or more memory units including instructions that, upon execution by the processors, are executed to:
execute the standard BMC firmware stack, the standard BMC firmware stack storing data in a first memory location, the data used for operation of the standard BMC firmware stack;
halt execution of the standard BMC firmware stack, and begin execution of the custom BMC firmware stack having a second memory location, wherein the data is copied from the first memory location to the second memory location for use by the custom BMC firmware stack; and
halt execution of the custom BMC firmware stack, and begin execution of the standard BMC firmware stack, wherein the data is copied from the second memory location to the first memory location for use again by the standard BMC firmware stack.

2. The IHS of claim 1, wherein the data comprises security-based data including at least one of user login credentials, user access rights, and user preferences.

3. The IHS of claim 2, wherein the instructions are further executed to:
receive user input for selecting which types of the secure configuration data is to be copied to the second memory location.

4. The IHS of claim 1, wherein the instructions are further executed to:
provide an encrypted read-write partition comprising the second memory location to the custom BMC firmware stack.

5. The IHS of claim 4, wherein the instructions are further executed to:
using a hidden root key (HRK), generate a derived HRK, wherein the HRK is digitally signed by an administrator of the IHS; and
provide the derived HRK to the custom BMC firmware stack for accessing the second memory location using the derived HRK.

6. The IHS of claim 5, wherein the instructions are further executed to:
provide the HRK to the standard BMC firmware stack; and
inhibit the custom BMC firmware stack from accessing the HRK.

7. The IHS of claim 5, wherein the instructions are further executed to:
generate the derived HRK using a unique identifier of the BMC such that the derived HRK is unique to the BMC.

8. The IHS of claim 1, wherein the data comprises firmware data comprising at least one of BMC settings, IHS settings, BMC firmware stack working variables, IHS status information, BMC telemetry data, and IHS telemetry data.

9. The IHS of claim 8, wherein the instructions are further executed to begin execution of the custom BMC firmware stack by:
creating the second memory location, copy the firmware data from the first memory location to the second memory location, and then booting the custom BMC firmware stack.

10. A data sharing method for a multi-boot baseboard management controller (BMC), the method comprising:
simultaneously storing a standard firmware stack and a custom firmware stack in the BMC;
executing, using instructions stored in at least one memory and executed by at least one processor, the standard BMC firmware stack using a BMC in communication with a plurality of hardware devices of an information handling system (IHS), the standard BMC firmware stack storing data in a first memory location, the data used for operation of the standard BMC firmware stack;
halting, using the instructions, execution of the first standard BMC firmware stack, and beginning execution of the custom BMC firmware stack having a second memory location, wherein the data is copied from the first memory location to the second memory location for use by the second custom BMC firmware stack; and
halting execution of the custom BMC firmware stack, and beginning execution of the standard BMC firmware stack, wherein the data is copied from the second memory location to the first memory location for use again by the standard BMC firmware stack.

11. The method of claim 10, further comprising:
providing an encrypted read-write partition comprising the second memory location to the custom BMC firmware stack;
wherein the data comprises security-based data including at least one of user login credentials, one or more user access rights, and one or more user preferences.

12. The method of claim 11, further comprising:
using a hidden root key (HRK), generating a derived HRK, wherein the HRK is digitally signed by an administrator of the IHS; and providing the derived HRK to the custom BMC firmware stack for accessing the second memory location using a derived handover root key (HRK).

13. The method of claim 12, further comprising:
providing the HRK to the standard BMC firmware stack; and
inhibiting the custom BMC firmware stack from accessing the HRK.

14. The method of claim 12, further comprising:
generating the derived HRK using a unique identifier of the BMC such that the derived HRK is unique to the BMC.

15. The method of claim 11, further comprising:
receiving user input for selecting which types of the secure configuration data is to be copied to the second memory location.

16. The method of claim 10, wherein the data comprises firmware data comprising at least one of BMC settings, IHS settings, BMC firmware stack working variables, IHS status information, BMC telemetry data, and IHS telemetry data.

17. The method of claim 16, further comprising beginning execution of the custom BMC firmware stack by:
creating the second memory location, copying the firmware data from the first memory location to the second memory location, and then booting the custom BMC firmware stack.

18. A baseboard management controller (BMC) in communication with the plurality of hardware devices of an information handling system (IHS), the BMC comprising:
one or more processors and one or more memory units including instructions that, upon execution by the processors, are executed to:
simultaneously store a standard firmware stack and a custom firmware stack in the memory units;
execute the standard BMC firmware stack, the standard BMC firmware stack storing data in a first memory location, the data used for operation of the standard BMC firmware stack;
halt execution of the standard BMC firmware stack, and begin execution of a the custom BMC firmware stack having a second memory location, wherein the data is copied from the first memory location to the second memory location for use by the custom BMC firmware stack; and
halt execution of the custom BMC firmware stack, and begin execution of the standard BMC firmware stack, wherein the data is copied from the second memory location to the first memory location for use again by the standard BMC firmware stack.

* * * * *

UNITED STATES PATENT AND TRADEMARK OFFICE
CERTIFICATE OF CORRECTION

Page 1 of 1

PATENT NO. : 12,164,638 B2
APPLICATION NO. : 17/347045
DATED : December 10, 2024
INVENTOR(S) : Akkiah Choudary Maddukuri et al.

It is certified that error appears in the above-identified patent and that said Letters Patent is hereby corrected as shown below:

In the Claims

In Column 18 Line 45 Claim 10, delete "halting, using the instructions, execution of the first" and insert -- halting, using the instructions, execution of the -- therefor.

Signed and Sealed this
Seventh Day of January, 2025

Derrick Brent
*Acting Director of the United States Patent and Trademark Office*